US010918143B2

(12) United States Patent
Jackson

(10) Patent No.: US 10,918,143 B2
(45) Date of Patent: Feb. 16, 2021

(54) PROTECTIVE FOAM MASK

(71) Applicant: Global Archery, Inc., Ashley, IN (US)

(72) Inventor: John Jackson, Ashley, IN (US)

(73) Assignee: Global Archery, Inc., Ashley, IN (US)

( * ) Notice: Subject to any disclaimer, the term of this patent is extended or adjusted under 35 U.S.C. 154(b) by 0 days.

(21) Appl. No.: 15/909,495

(22) Filed: Mar. 1, 2018

(65) Prior Publication Data

US 2018/0249771 A1 Sep. 6, 2018

Related U.S. Application Data

(60) Provisional application No. 62/465,462, filed on Mar. 1, 2017.

(51) Int. Cl.
*A41D 13/11* (2006.01)
*A63B 71/10* (2006.01)
(Continued)

(52) U.S. Cl.
CPC ...... *A41D 13/1184* (2013.01); *A41D 13/1161* (2013.01); *B32B 5/32* (2013.01);
(Continued)

(58) Field of Classification Search
CPC ....... A63B 71/10; A63B 2209/00; A42C 5/04; A42B 3/18; A42B 3/32; A42B 3/22;
(Continued)

(56) References Cited

U.S. PATENT DOCUMENTS 4,075,717 A * 2/1978 Lemelson .............. A42B 3/065
2/412
4,279,038 A 7/1981 Bruckner et al.
(Continued)

FOREIGN PATENT DOCUMENTS

| GB | 2524760 A | * | 10/2015 | ............. | A63B 71/10 |
| WO | WO2000/18262 | | 4/2000 | | |
| WO | WO-2012074411 A1 | * | 6/2012 | ............. | G02C 7/165 |

OTHER PUBLICATIONS amazon.com; OutdoorMaster Airsoft Mask, Full Face with Metal Mesh Eye Protection; Nov. 30, 2016.
(Continued)

*Primary Examiner* — Sally Haden
*Assistant Examiner* — Erick I Lopez
(74) *Attorney, Agent, or Firm* — Indiano Law Group, LLC

(57) ABSTRACT

One form of the present application is directed to a protective foam face mask which includes a frontal portion structured to cover at least a portion of a face of a user, wherein the frontal portion defines an ocular cavity. The foam face mask further includes two side portions astride the ocular cavity extending rearwardly from the frontal portion, wherein the side portions are structured to cover the ears of a user, and wherein the frontal portion and the side portions are constructed of a foam. The foam face mask further comprises a mesh eye shield extending across the ocular cavity, wherein an outer perimeter of the mesh eye shield is encased in the foam of the frontal portion and the side portions, and wherein the frontal portion, the side portions, and the mesh eye shield form a unitary face mask structure.

5 Claims, 8 Drawing Sheets

(51) Int. Cl.
*B32B 5/32* (2006.01)
*C08G 101/00* (2006.01)
(52) U.S. Cl.
CPC ....... *A41D 13/1138* (2013.01); *A63B 2209/00* (2013.01); *C08G 2101/005* (2013.01)
(58) Field of Classification Search
CPC .. A42B 3/225; A42B 3/24; A42B 3/28; A41D 13/1184; A41D 13/1161; A41D 13/1138; B32B 5/32; C08G 2101/005
USPC .................................................................. 2/9
See application file for complete search history.

(56) References Cited

U.S. PATENT DOCUMENTS

| | | | |
|---|---|---|---|
| 4,754,501 A | 7/1988 | Yahn | |
| 5,184,354 A * | 2/1993 | Alfaro | A61F 9/02 2/425 |
| 5,809,572 A * | 9/1998 | Sisolak | A42B 1/046 2/173 |
| 5,862,529 A * | 1/1999 | Moodie | A61F 9/02 2/431 |
| 6,389,607 B1 | 5/2002 | Wood | |
| 8,484,762 B2 * | 7/2013 | Goldstein | A42B 3/20 2/9 |
| 9,027,163 B1 * | 5/2015 | Schmidt | A63B 71/10 2/424 |
| 2004/0209744 A1 | 10/2004 | Tsujimoto | |
| 2005/0022823 A1 * | 2/2005 | Davison | A61F 9/029 128/858 |
| 2007/0050895 A1 * | 3/2007 | Broersma | A42B 3/20 2/426 |
| 2008/0189821 A1 * | 8/2008 | Anderson | A42B 3/18 2/9 |
| 2014/0317835 A1 * | 10/2014 | Mejia, Jr. | A42B 3/20 2/424 |
| 2017/0265556 A1 * | 9/2017 | Yang | A42B 3/128 |

OTHER PUBLICATIONS http://www.outdoormaster.com/product/full-face-airsoft-mask-with-metal-mesh-eye-protection/. Full Face Airsoft Mask Wth Metal Mesh Eye Protection; Dec. 1, 2016.

http://www.airsoftmegastore.com/7405-src-full-face-tactical-sansei-rnesh-face-mask-od-green.aspx. SRC Full-Face Tactical Sansei Mesh Face Mask; Dec. 3, 2016.

* cited by examiner

PROTECTIVE FOAM MASK

CROSS REFERENCE TO RELATED APPLICATIONS

The present application claims the benefit of U.S. Provisional Patent Application No. 62/465,462 filed Mar. 1, 2017, the entirety of which is incorporated herein by reference.

BACKGROUND

Various protective face masks have been developed over the years for use with sporting activities. Many such masks are heavy, expensive to manufacture, difficult to clean, and are prone to fogging. These masks often include multiple pieces which are joined via screws or other detachable fasteners and frequently include internal padding which has a cloth or similar lining which is in contact with a surface of the skin. This lining can absorb sweat and grime which are encountered during various sporting activities. Protective sports masks also typically only fit one size or have a limited range of sizes necessitating masks of various sizes to be purchased. Many masks include a clear polymer eye shield which, while providing eye protection, is prone fogging during physical exertion. Therefore, further technological developments are desirable in this area.

SUMMARY

One embodiment of the present application includes a foam mask including an integral mesh eye shield. Other embodiments include unique foam mask apparatuses and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
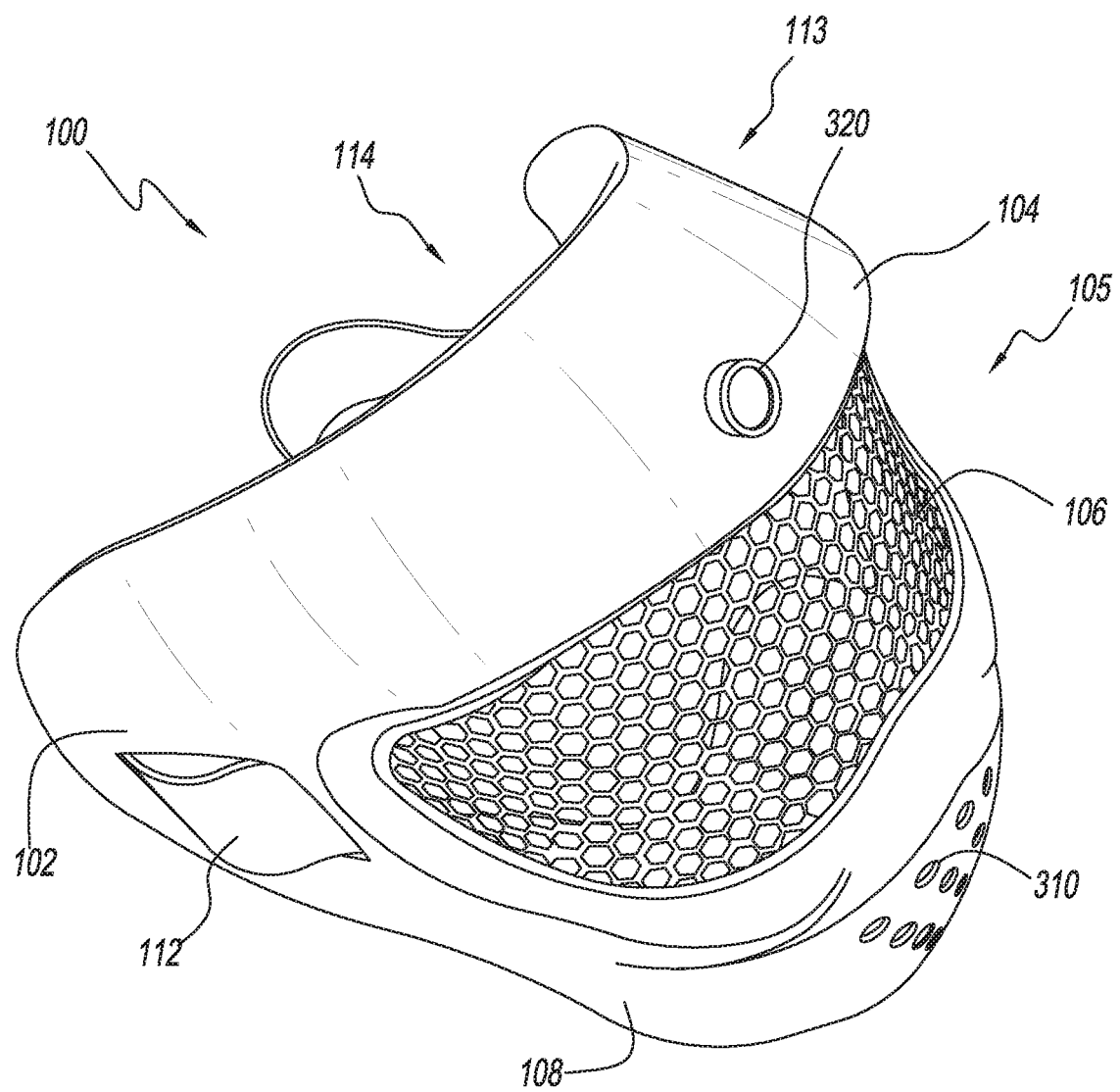
FIG. 1 depicts one embodiment of a foam face mask of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

FIG. 1 illustrates a protective face mask 100. The protective face mask 100 is constructed of a foam 113. The foam mask 100 is worn on the face of a user to provide protection thereto, such as from non-lethal foam arrows or other projectiles which may be used in, for example, non-lethal archery games. The foam mask 100 can be sized sufficiently to provide protection to the face, eyes, nose, cheeks, and ears of a user. The foam mask 100 includes a frontal portion 105 having an upper portion 104 and a lower portion 108. Two side portions 102 extend rearwardly relative the upper portion 104 and the lower portion 108. An integral mesh eye shield 106 is located between the upper portion 104 and the lower portion 108. The foam mask 100 can be retained to the face of a user via a strap 112. The foam mask 100 has an open top portion 114 which permits the side portions 102 of the foam mask 100 to move inward or outward, such that the foam mask 100 can be adjusted to fit users of various sizes, as will be described hereinafter.

Figure 2:
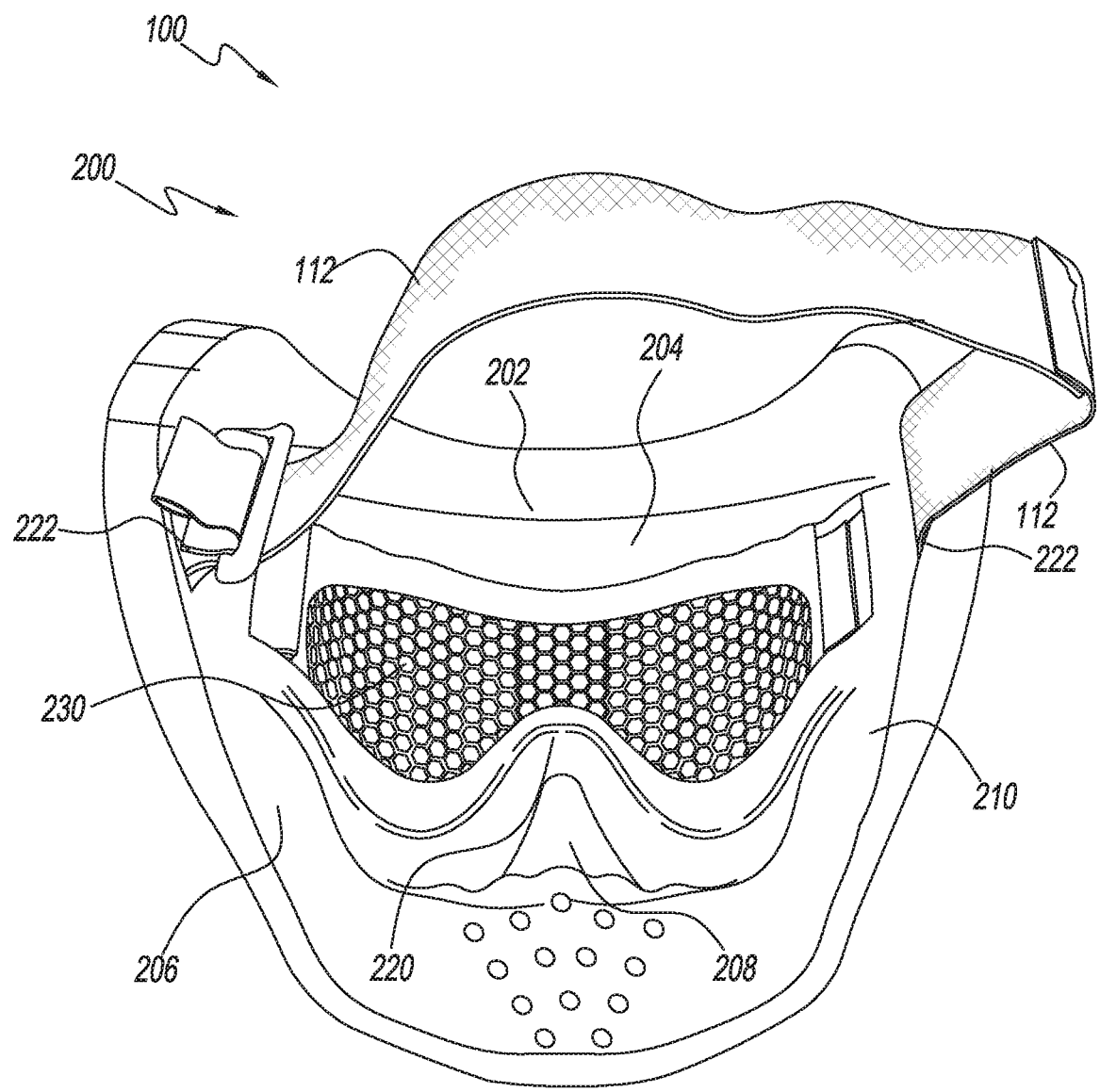
FIG. 2 depicts a rear view of the foam face mask of FIG. 1.

FIG. 2 depicts a rear view 200 of the protective foam mask 100. A foam skirt 204 protrudes inwardly relative an inner surface 210 of the mask 100. The foam skirt 204 is configured to be in engaged contact with portions of a user's face. The foam skirt 204 includes a forehead portion 202 configured to extend across a portion of a user's forehead and/or brow area, a cheek portion 206 configured to extend across a portion of a user's cheek, and a nasal portion 220 configured to traverse the nose of a user. The nasal portion 220 defines a nasal cavity 208 configured to receive the nose of a user. As is illustrated, the foam skirt 204 surrounds and defines an ocular cavity 230. In one form, the forehead portion 202 and the cheek portion 206 protrude a sufficient depth from the inner surface 210 such that the front of a user's face is not in contact with the inner surface 210. In some forms, the foam skirt 204 can be of a depth sufficient to permit a user to ear glasses beneath the foam mask 100. The foam skirt 204 remains in engaged contact with a user's face. The foam skirt 204 reduces the likelihood of any portion of the protective foam mask 100 coming in contact with a user's eyes during impact of an object, such as a non-lethal arrow.

The foam skirt 204 is retained in engaged contact with portions of a user's face via strap 112. The strap 112 is structured to extend across the rear of a user's head and place the foam skirt 204 in retained engagement with the user's face. The strap 112 can be attached to the side portions 102 of the face mask 100 at attachment points 222. Additionally, the strap 112 can be adjustable, for example through the use of a hook and loop fastener system. It is contemplated that any strap 112 can be utilized which can retain the foam mask 100 to the face of a user.

The nasal portion 220 defines the nasal cavity 208. The nasal cavity 208 is configured to receive the nose of a user therein. The nasal portion 220 substantially blocks heated airflow exiting a user's nose and mouth from entering the ocular cavity 230. Referring back to FIG. 1, a plurality of apertures 310 can be disposed in the lower portion 108. The apertures 310 permit fresh air to readily enter the mask and permits the exhaust of hot air exiting a user's nose and mouth.

In some forms, the foam mask 100 can include a camera 320. As illustrated, the camera 320 can be integrated into the forehead portion 104 of the foam mask 100. However, it is contemplated that camera 320 can be integrated into or with various other portions of the foam mask 100, including side portions 102, depending upon the specific design parameters and type of camera 320 utilized, as would be understood by one of ordinary skill.

The foam mask 100 includes a mesh eye shield 106. The mesh eye shield 106 can be formed of various metals, plastics, or the like. As would be understood to one of ordinary skill in the art, the size of mesh as well as the mesh construction utilized for the mesh eye shield 106 can vary depending upon the application. For example, a relatively large sturdy mesh may be utilized for archery games with non-lethal arrows; however, a fine mesh may be utilized for airsoft. In one specific embodiment, the mesh eye shield is comprised of a hexagonal mesh 106, as is illustrated in FIGS. 1-2. In another form the mesh eye shield 106 is a welded wire "square-type grid" mesh. However, it is contemplated that a variety of mesh sizing, as well as mesh construction and material (e.g. polymers, metals, etc.), may be utilized such that a desired level of eye protection is achieved. As can be readily appreciated by one of ordinary skill, the mesh construction of the eye shield 106 eliminates any fogging of the eye shield, thereby preserving the vision of a user.

The foam mask 100 is constructed of a foam 113. Foam 113, as utilized herein, includes any substance formed by trapping pockets of a gas in a solid or semi-solid, or any other substance one of ordinary skill in the art understands to comprise foam. The foam mask 100 can be constructed of various types of foam 113, which include, but are, not limited to, polyurethane foam, XPS foam, expandable polystyrene foam, ethylene vinyl acetate (EVA) polyolefin foam, and any other foam which provides suitable padding, protection, and durability for a desired application. Depending upon the application, the foam mask 100 can be constructed of open-cell or closed-cell foams 113.

In one form, the foam face mask 100 is formed of a pliable, closed-cell polyethylene (PE) foam 113. This closed-cell construction of the foam mask 100 provides the user with the ability to easily clean the mask as a closed-cell construction does not absorb moisture. This construction also yields a very light and pliable, yet durable mask 100. In one alternative form, an open-cell foam 113 is utilized and the foam 113 is "skimmed" such that the foam will not receive moisture therein.

Figure 3:
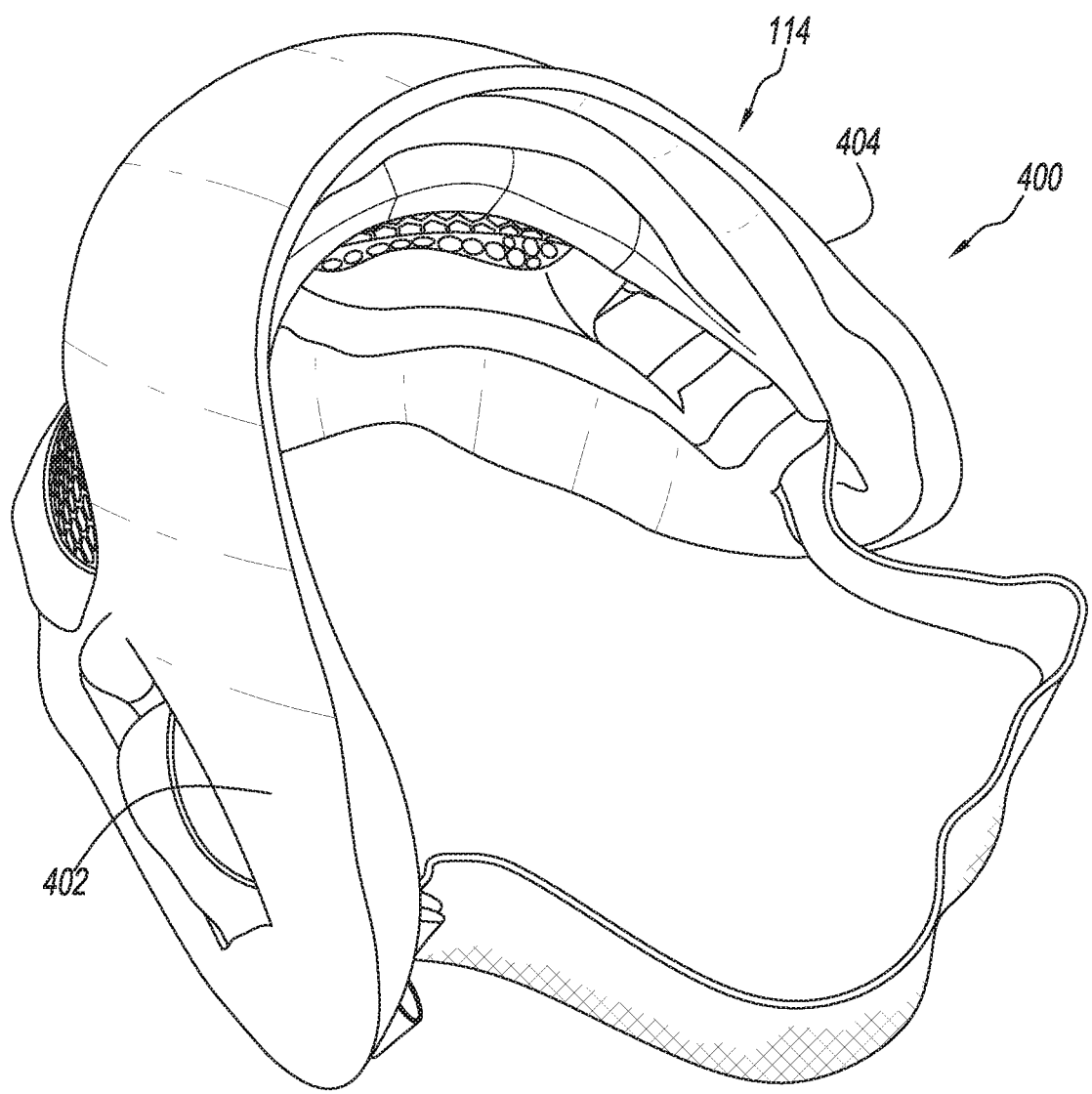
FIG. 3 depicts a partial side view of the foam face mask of FIG. 1.

Referring now FIG. 3, the upper opening 114 of the foam face mask 100, as well as the pliability of the foam 113 utilized within the foam face mask 100, permits a user to adjust the size of the mask to conform to their particular sizing needs. FIG. 3 illustrates the foam face mask 100 in a large mask configuration 400, whereby the side portions 102, depicted as the left side portion 402 and the right side portion 404, are separated by a significant space. The left side portion 402 and the right side portion 404 can be moved inward to a small mask configuration, whereby the left side portion 402 and the right side portion 404 touch. The flexibility of the side portion 402, 404, in combination with the strap 112, permit the foam face mask 100 to conform to a variety of user head sizes. The strap 112 can retain the foam face mask 100 to the head of a user in the desired sizing position by traversing across the back of the head and/or neck of a user.

Figure 4:
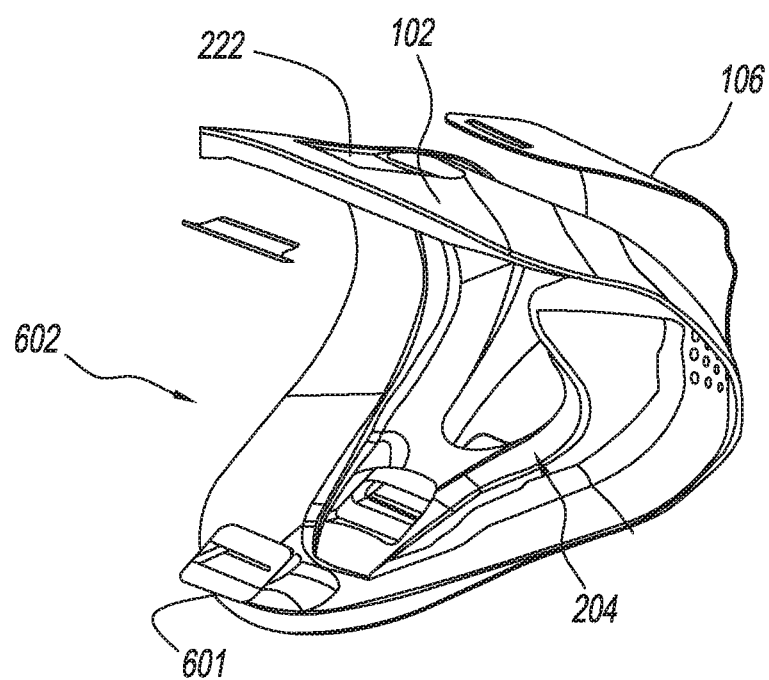
FIG. 4 depicts an exemplary cut-away view of an injection molded foam face mask.

The mesh eye shield 106 is integrally formed with the foam face mask 100 such that a unitary structure is formed. This monolithic mask formation can be accomplished through a variety of foam forming methods. Although two such process are described hereinafter, it is contemplated that any forming process may be used such that a unitary foam mask 100 results therefrom. In one form, a mesh eye shield 106 is inserted into a single cavity mold which is then injected with foam in an injection molding operation. Referring now to FIG. 4, inserts 601 are disposed within a mold 602 to center and retain the mesh eye shield 106. A foam 113 is then injected into the mold 602. The foam 113 surrounds the inserts 601 and flows through the mesh in an outer perimeter of the mesh eye shield 106. A one-piece foam face mask 100 results from this injection molding, wherein the inserts 601 and mesh eye shield 106 are retained within the foam 113 of the face mask 100.

Figure 5:
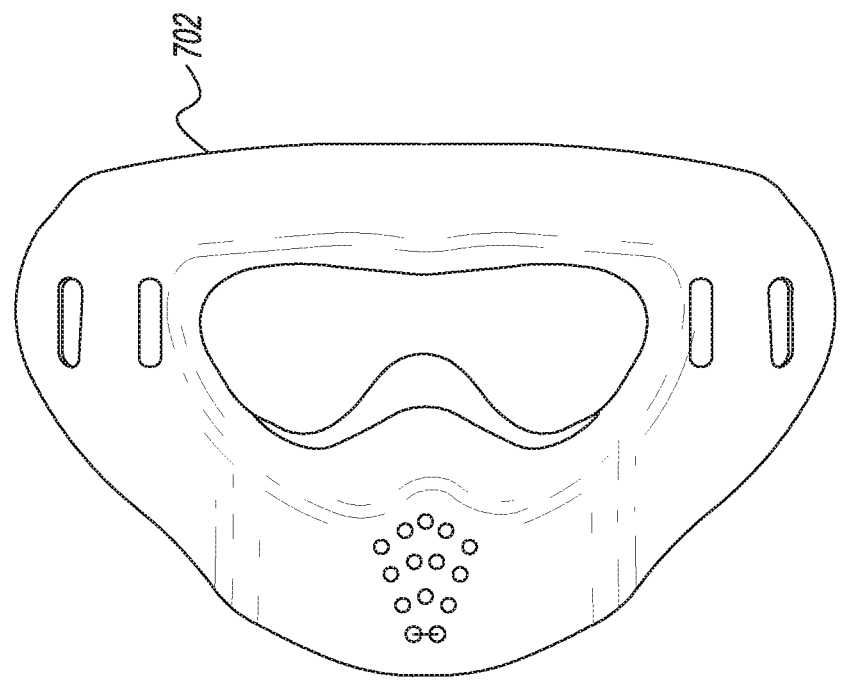
FIG. 5 depicts an exemplary cut-away view of a compression molded foam face mask.
Figure 5:
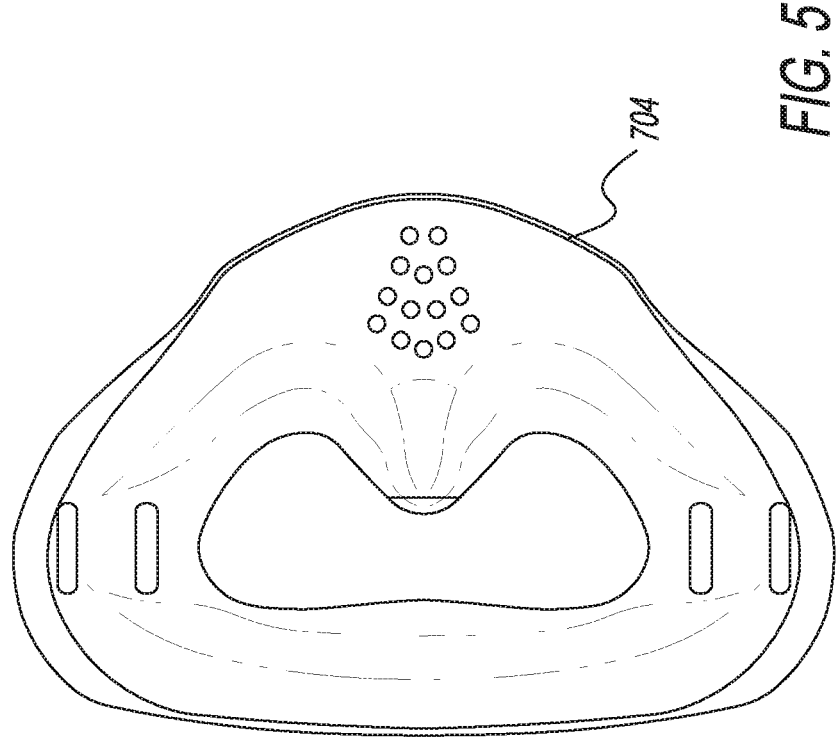

Alternatively, the foam face mask 100 is formed through a compression molding process. As is illustrated in FIG. 5, a plurality of pieces of foam 702, 704 can be disposed into a single mold cavity. The mesh eye shield 106 is then placed between the foam pieces 702, 704 such that a portion of the foam on 702 and a portion of the foam on 704 overlaps at least a portion of the outer perimeter 906 of the mesh eye shield 106. In this form, once the foam 702, 704 and mesh eye shield 106 are inserted into the mold, a combination of pressure and heat are utilized to fuse the foams together and fuse the foam between a portion of mesh within the mesh eye shield 106, thereby retaining the mesh eye shield 106 between the foam 702, 704 and forming a unitary foam face mask 100. Although this process has been described with only two foam pieces 702, and 704, it is contemplated that as many foam pieces may be incorporated into the mold, as would be desired for the particular application.

Figure 6:
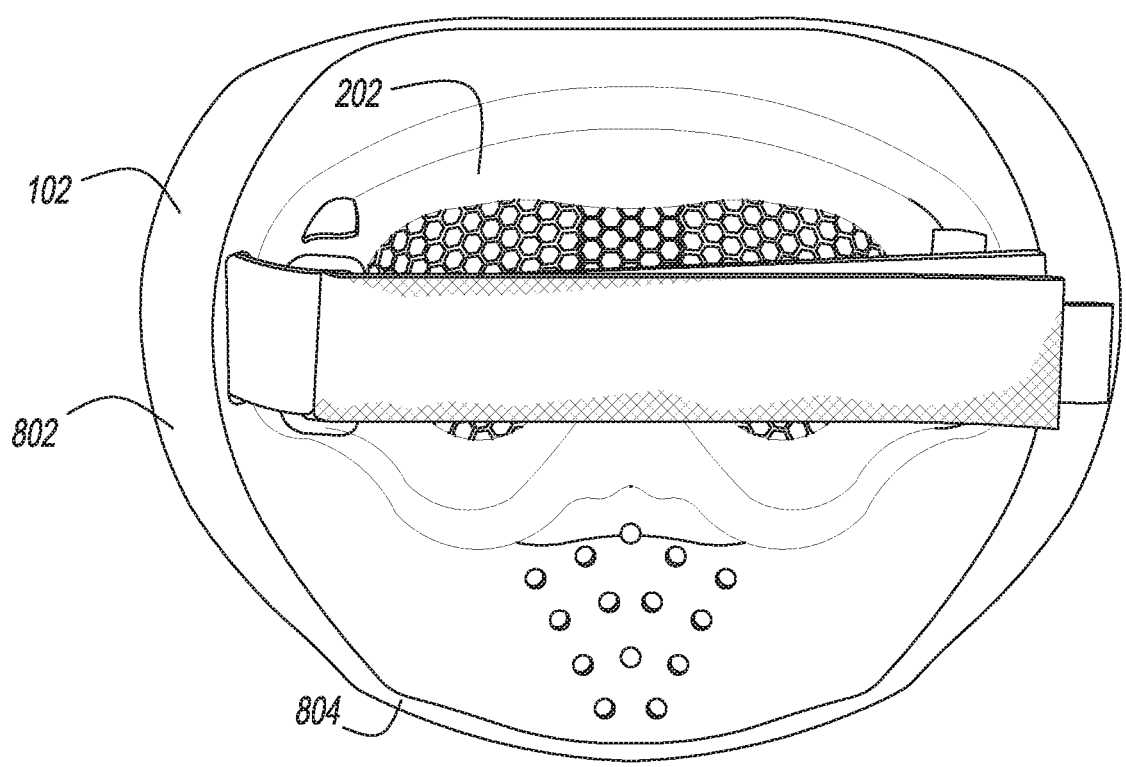
FIG. 6 depicts a rear view of the foam face mask of FIG. 1.

The compression molding process permits multiple densities of foam 113 as well as multiple foam types to be combined within a single foam mask 100. For example, an outer mask portion 702 can be formed of a 3 pound density PE foam and an inner mask portion 704 can be formed of a 2 pound EVA foam. To achieve a desired foam density, one of ordinary skill will readily appreciate that the pressure and heat from the selected forming process must be factored in when choosing a base stock. Referring now to FIG. 6, the foam mask 100 can vary in thickness (illustrated at 802, 804). The desired thickness can be selected based in part upon the amount of protection desired as well as the type and density of foam 113 utilized. Referring back to FIG. 5, a higher density foam 113 can utilized for the outer mask portion 702, which can come into contact with various projectiles, while a lower density foam 113 is utilized for the inner ask portion 704 which is in contact with the face of a user. As will be appreciated by one of ordinary skill in the art, any foam(s) 113 and density of foam 113 may be utilized which provides the desired amount of protection for the end user.

Figure 7:
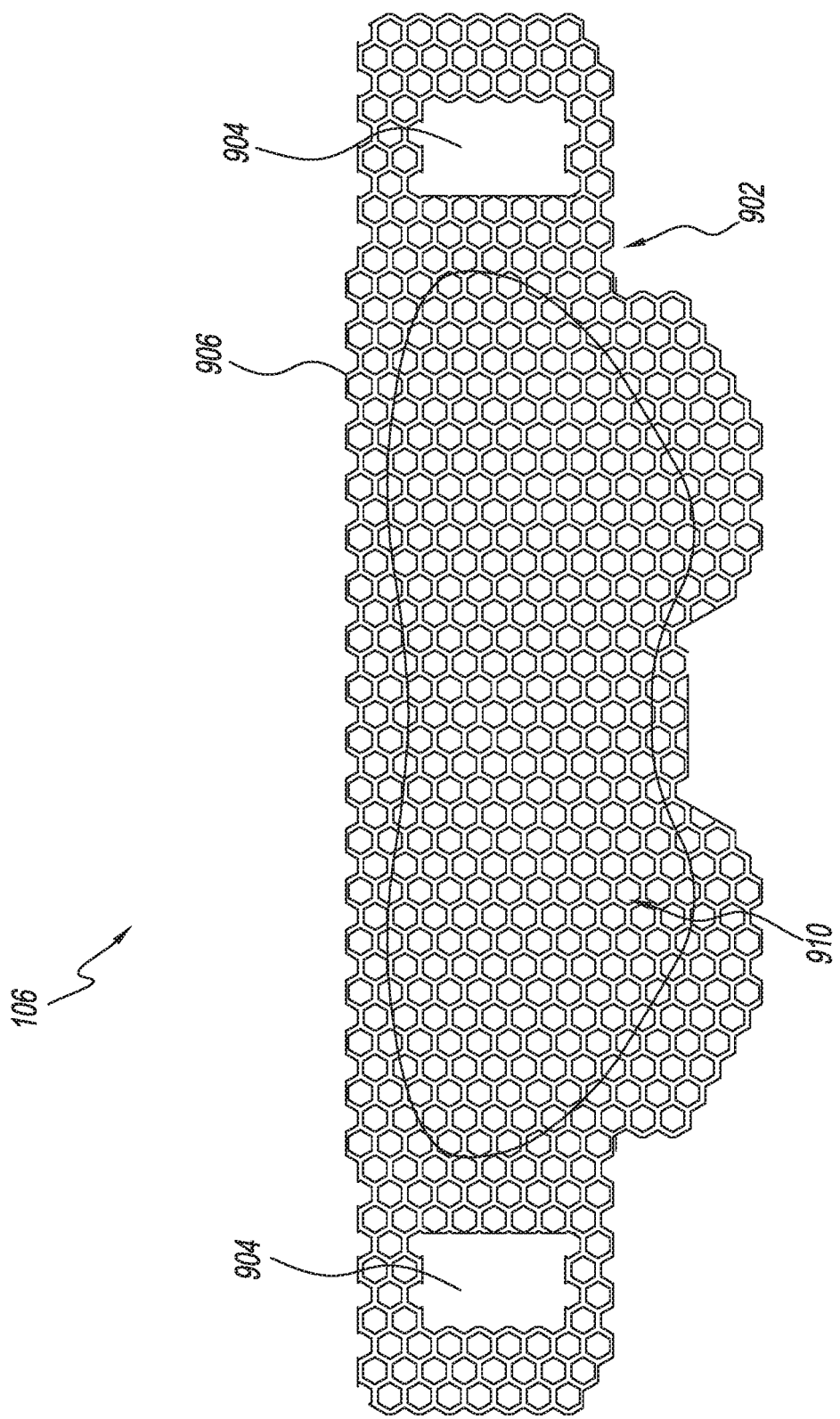
FIG. 7 depicts an exemplary mesh eye shield.

FIG. 7 illustrates one form of the mesh eye shield 106. As was aforementioned, a perimeter portion 906 of the mesh eye shield 106 is encased and retained by foam 113. A user sees out of the foam face mask 100 through the mesh portion 910 which passes across the ocular cavity 230. As is illustrated at 902, the mesh eye shield 106 can be trimmed such that individual wires mesh pieces will not protrude from the foam face mask 100, even when significant forces exerted onto the foam face mask 100. Strap retention portions 904, illustrated on either side of the mesh eye shield 106, are configured to have a portion of the strap 112 pass therethrough.

Figure 8:
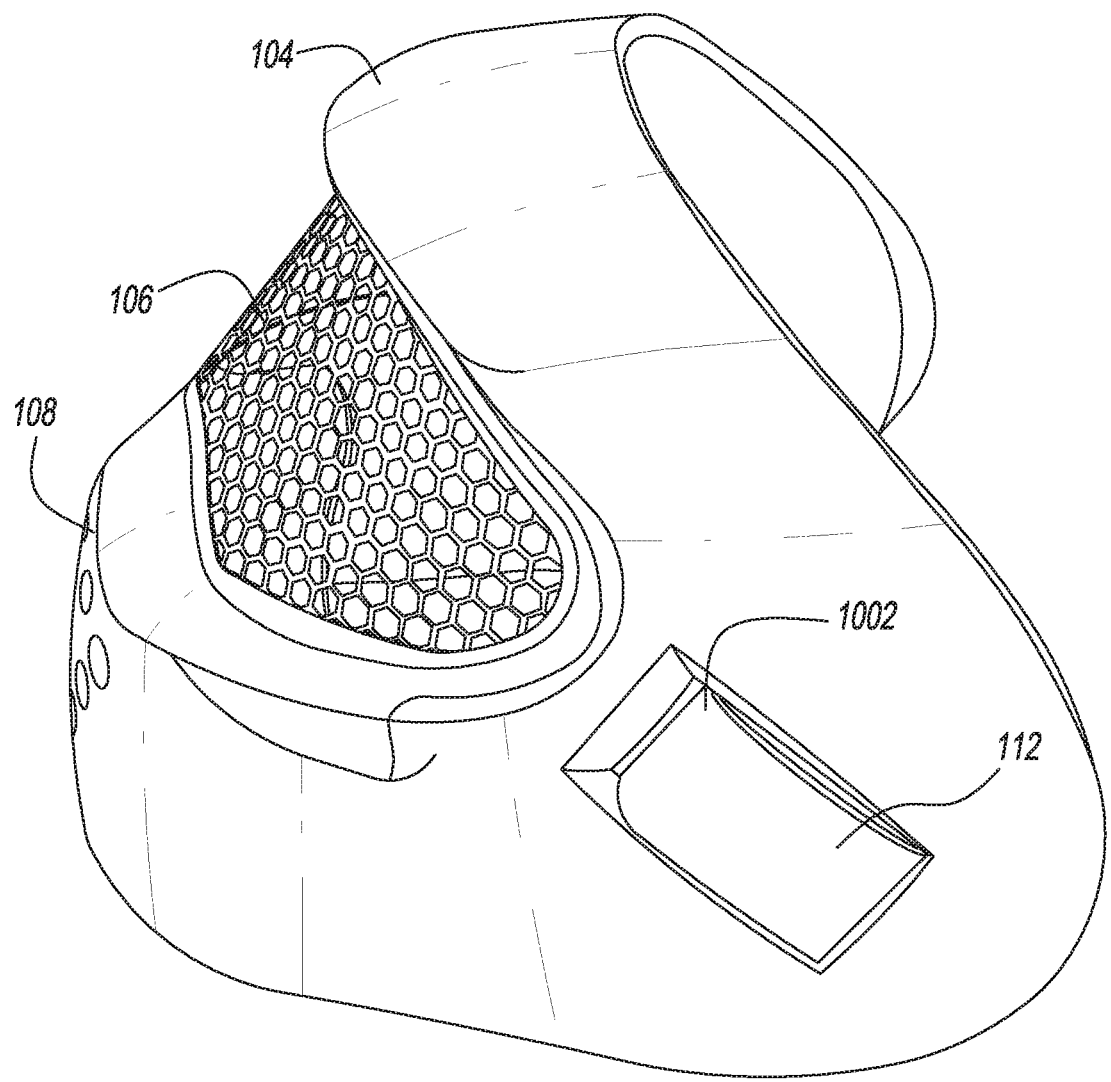
FIG. 8 depicts a partial side view of the foam face mask of FIG. 1.

Referring now to FIG. 8, 1002 illustrates the strap retention portion 904 covered in foam 113. The strap 112 passes through the exterior foam through the mesh strap retention portion 904, and through the interior foam. In passing strap 112 through the strap retention portion 904 of mesh eye shield 106, a very sturdy attachment point is formed and the possibility of the strap 112 tearing through the foam face mask 100, resulting in the foam face mask falling off the face of a user, is greatly reduced.

While the invention has been described in connection with what is presently considered to be the most practical and preferred embodiment, it is to be understood that the invention is net to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any, embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A protective foam face mask, comprising:
    an upper frontal portion structured to extend across the forehead of a user;
    a lower frontal portion structured to extend across the jaw of the user, wherein an ocular cavity is defined between the upper frontal portion and the lower frontal portion;
    two opposing side portions which extend rearwardly from opposing sides of the ocular cavity, wherein the upper frontal portion and the lower frontal portion are coupled with the two opposing side portions at a location rearward of the ocular cavity;
    wherein the upper frontal portion, the lower frontal portion, and the two opposing side portions are integrally formed of a foam, wherein the foam of the upper frontal portion is structured to provide impact protection to the forehead of the user, and wherein the foam of the two opposing side portions is structured to cover, and provide impact protection to, ears of the user;
    a mesh portion defining a mesh eye shield, wherein the mesh eye shield extends across the ocular cavity, wherein an outer perimeter of the mesh eye shield is retained to the upper frontal portion and the lower frontal portion through encasement in the foam of the upper frontal portion and the lower frontal portion, and wherein the mesh portion further extends rearwardly with the two opposing side portions, and wherein the upper frontal portion, the lower frontal portion, the two opposing side portions, and the mesh portion form a unitary face mask structure; and
    a strap attachment point located in at least one of the two opposing side portions, wherein the strap attachment point is structured such that a portion of a retention strap extends through the foam and mesh portion in the at least one of the two opposing side portions, and wherein the mesh portion firmly retains the retention strap to the unitary face mask structure.

2. The protective foam face mask of claim 1, further comprising a skirt extending inwardly from an inner surface of the upper frontal portion and the lower frontal portion, wherein the skirt extends around at least a portion of a perimeter of the ocular cavity, and wherein the skirt is configured to engage with a face of the user.

3. The protective foam face mask of claim 2, wherein the upper frontal portion, the lower frontal portion, the two opposing side portions, the mesh eye shield, and the skirt are monolithically molded within a single cavity mold, and wherein the upper frontal portion includes a rearwardly extending curvature.

4. The protective foam face mask of claim 1, wherein the foam of the unitary face mask structure further comprises a first foam and a second foam, wherein the first foam defines an exterior portion of the unitary face mask structure, wherein an interior portion of the unitary face mask structure is comprised of the second foam, and wherein a density of the first foam is greater than a density of the second foam.

5. The protective foam mask of claim 1, wherein the foam comprises a closed cell polyethylene foam.

\* \* \* \* \*